United States Patent
Michel

(10) Patent No.: US 8,376,329 B2
(45) Date of Patent: Feb. 19, 2013

(54) STRUT FOR A MOTOR VEHICLE WITH AN AXIALLY ADJUSTABLE SPRING PLATE

(75) Inventor: Wilfried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 1109 days.

(21) Appl. No.: 12/137,423

(22) Filed: Jun. 11, 2008

(65) Prior Publication Data

US 2009/0014931 A1    Jan. 15, 2009

(30) Foreign Application Priority Data

Jun. 15, 2007   (DE) .......................... 10 2007 027 514

(51) Int. Cl.
*F16M 1/00* (2006.01)
*F16F 1/06* (2006.01)
(52) U.S. Cl. ..................................... 267/140.5; 267/179
(58) Field of Classification Search .................. 267/220, 267/292, 170, 175, 177, 179, 140.5; 188/321.11, 188/322.22
See application file for complete search history.

(56) References Cited

U.S. PATENT DOCUMENTS

| | | | | |
|---|---|---|---|---|
| 1,438,527 | A * | 12/1922 | Holmes .......................... | 267/64.28 |
| 4,531,484 | A * | 7/1985 | Kimura et al. .................. | 123/192.1 |
| 5,338,055 | A * | 8/1994 | Mauz .............................. | 280/124.147 |
| 6,079,700 | A * | 6/2000 | Solomond et al. ............... | 267/221 |
| 6,413,164 | B1 * | 7/2002 | Vogl et al. ....................... | 464/79 |
| 6,805,357 | B2 * | 10/2004 | Dahlheimer .................... | 277/377 |
| 2002/0003326 | A1 * | 1/2002 | Eichhorn et al. ............... | 267/64.17 |
| 2004/0245691 | A1 * | 12/2004 | Handke et al. .................. | 267/292 |
| 2007/0170684 | A1 * | 7/2007 | Ohkita et al. ................... | 280/124.147 |

FOREIGN PATENT DOCUMENTS

| | | | |
|---|---|---|---|
| DE | 19832321 | * | 2/2000 |
| DE | 102 55 764 B3 | | 2/2004 |
| DE | 10 2005 001 742 A1 | | 3/2006 |
| DE | 10 2005 001 742 A1 | | 3/2008 |

OTHER PUBLICATIONS

European Search Report dates Sep. 1, 2008.

* cited by examiner

*Primary Examiner* — Bradley King
*Assistant Examiner* — Vishal Sahni
(74) *Attorney, Agent, or Firm* — Novak Druce Connolly Bove + Quigg LLP

(57) ABSTRACT

The invention relates to a strut for a motor vehicle with an axially adjustable spring plate comprising a vibration damper with a cylinder and a piston rod, a support spring which is dynamically connected to the spring plate, a ring electric motor with a rotor and a stator, a ball screw with a threaded spindle which is pivoted on the piston rod, and a threaded nut for translational motion of the spring plate, and a bearing arrangement for fixing the strut on the vehicle body, the bearing arrangement having spherical bearing surfaces which allow at least a pivoting motion of the strut to the vehicle body. The invention is characterized in that in the region of the bearing arrangement the vehicle body is dynamically connected to the strut by way of a radially-stiff and rotationally-stiff component which is axially and cardanically soft.

2 Claims, 2 Drawing Sheets

(State of the art)

STRUT FOR A MOTOR VEHICLE WITH AN AXIALLY ADJUSTABLE SPRING PLATE

The invention relates to a strut for a motor vehicle with an axially adjustable spring plate.

BACKGROUND OF THE INVENTION

A generic strut for a motor vehicle with an axially adjustable spring plate is described in DE 10 2005 001 742 A1. The disclosed strut comprises essentially a vibration damper with a cylinder and a piston rod which is supported to be able to move axially therein, a support spring which is dynamically connected to the spring plate, a ring electric motor with a rotor and a stator which is dynamically connected via its motor housing to the piston rod, as well as a ball screw with a threaded spindle which is pivoted on the piston rod, and a threaded nut. The strut is fixed on the vehicle body by way of a bearing arrangement, the bearing arrangement having spherical bearing surfaces which allow at least a pivoting motion of the strut to the vehicle body. The axial adjustment of the spring plate can be effected by the rotor being dynamically connected to the threaded spindle and the spring plate being dynamically connected to the threaded nut so that rotary motion of the rotor which has been initiated by the ring electric motor causes translational motion of the spring plate.

In this connection, the disadvantage is the circumstance that the piston rod is pivoted both in the bearing arrangement and also in the damper and that the motor housing which surrounds the stator is connected to the piston rod, that is, both the stator with the motor housing and also the rotor are not fixed with respect to the degree of rotational freedom. The consequence of this is that the reaction moments of rotary driving are not supported and the components can turn randomly to one another.

The object of the invention is to develop a strut for a motor vehicle with an axially adjustable spring plate while avoiding the indicated disadvantages such that support of driving moments is ensured.

SUMMARY OF THE INVENTION

According to the invention, the strut for a motor vehicle with an axially adjustable spring plate comprises a vibration damper with a cylinder and a piston rod which is supported to be able to move axially therein, a support spring which is dynamically connected to the axially adjustable spring plate, a ring electric motor with a rotor and a stator which is dynamically connected to the piston rod, a ball screw with a threaded spindle which is pivoted on the piston rod, and a threaded nut, the rotor being dynamically connected to the threaded spindle and the spring plate being dynamically connected to the threaded nut so that rotary motion of the rotor which is initiated by the ring electric motor causes translational motion of the spring plate, and a bearing arrangement for fixing the strut on the vehicle body, the bearing arrangement having spherical bearing surfaces which allow at least a pivoting motion of the strut to the vehicle body. According to the invention, in the region of the bearing arrangement the strut is dynamically connected to the vehicle body by way of a radially-stiff and rotationally-stiff component which is axially and cardanically soft.

The major advantage is that by providing the component according to the invention, universal motion of the strut is furthermore possible, i.e., that when the strut is deflected, no transverse forces at all occur in the bearing arrangements and damper guides, while the component is extremely stiff to torques, i.e., that support of the reaction moments of rotary driving is ensured.

The component in the region of the bearing arrangement preferably completely surrounds the piston rod. The execution of the component as a component which completely surrounds the bearing arrangement has the effect that in this way penetration of contaminants and dirt into the spherical bearing arrangement is successfully prevented.

According to a first embodiment of the invention, the component is fixed on the stator with its end region which faces away from the vehicle body.

According to a second embodiment, the component is fixed on the piston rod with its end region which faces away from the vehicle body.

Preferably the component is made as a metal bellows. The execution of the component as a metal bellows is especially advantageous since the folds of the metal bellows yield very easily when the angle changes and thus the metal bellows is very soft in this direction, while when torques are applied it is extremely stiff. It is specifically these properties which are required and desired and which are economically satisfied with this construction element.

Other advantages, features and possible applications of this invention will become apparent from the following description in conjunction with the embodiments shown in the drawings.

BRIEF DESCRIPTION OF THE DRAWINGS

The invention will be described below using the embodiments shown in the drawings.

DETAILED DESCRIPTION OF THE PREFERRED EMBODIMENTS OF THE INVENTION

Figure 1:
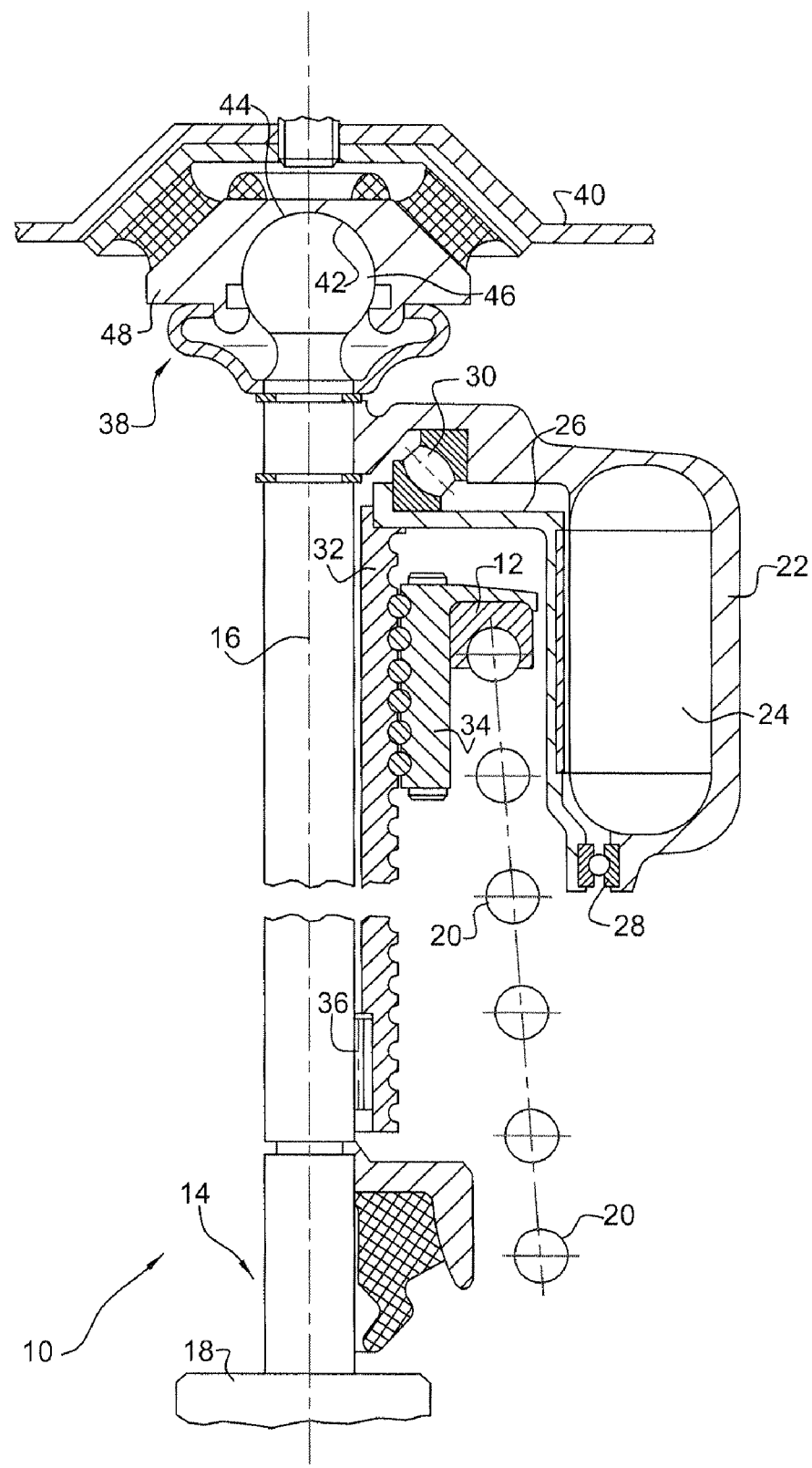
FIG. 1 shows a schematic section of a strut for a motor vehicle with an axially adjustable spring plate according to the state of the art.

The strut, which is designated as a whole as reference number 10 and which is shown more or less schematically in a simplified section in FIG. 1, with an axially adjustable spring plate 12 comprises essentially a known vibration damper 14 with a piston rod 16 which is axially supported to be able to move in the cylinder 18.

A support spring 20 is supported between the adjustable spring plate 12 and a cylinder-side or axle-side spring plate which is not shown here for reasons of clarity.

There is a ring electric motor in a housing 22 which is dynamically connected to the piston rod 16. The ring electric motor has a stator 24 and a rotor 26 which is supported therein and, which is positioned to the housing 22 by way of two bearings 28, 30. A threaded spindle 32 is attached to the rotor 26 and with a threaded nut 34 converts rotary motion into axial motion, the threaded nut being connected to the spring plate 12.

In order to be able to better support transverse forces which are acting on the threaded spindle 32, there is a radial bearing 36 between the piston rod 16 and the inside of the threaded spindle 32.

The entire strut 10 is connected to the vehicle body 40 by way of a single bearing arrangement 38. The bearing arrangement 38 has spherical bearing surfaces 42, 44 which allow at least a pivoting motion of the strut 10 to the vehicle body 40. Here the spherical bearing surfaces 42, 44 are formed on the ball head. A ball pivot 46 is supported in the ball socket 48 to be able to turn and pivot, so that three-dimensional resilient motion of the strut 10 to the vehicle body 40 can be carried out without deformation of bearing parts.

The strut 10, which is known from the prior art, is disadvantageous since the reaction moments of rotary driving cannot be supported.

The piston rod 16 is pivoted both in the bearing arrangement 38 and also in the cylinder 18. The housing 22 of the ring electric motor is likewise connected to the piston rod 16. If at this point the spring plate 12 is to be axially adjusted, the rotor 26 must be caused to rotate. This take place by way of the ring electric motor which is normally fixed relative to the strut 10. The stator 24 which is located in the housing 22, by applying a voltage, generates a magnetic field which accordingly applies a moment to the rotor 26. Depending on the friction conditions, transmission and support of the driving moments are in neutral equilibrium. Since both the stator 24 with the housing 22 and also the rotor 26 are not fixed with respect to a degree of rotational freedom, the two components can turn at will.

Figure 2:
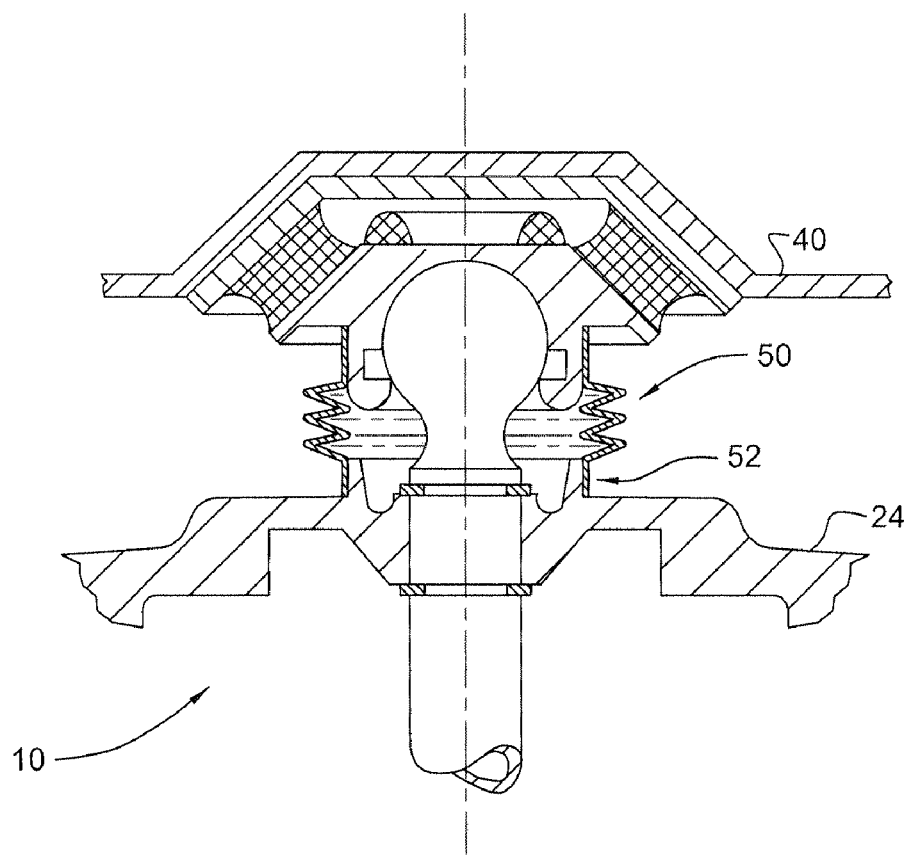
FIG. 2 shows a schematic section of the upper bearing arrangement of a strut according to the invention and FIG. 3 shows a schematic section of another embodiment of the upper bearing arrangement of a strut according to the invention.

To prevent this disadvantage, provision is made according to the strut 10 as claimed in the invention and as shown in FIG. 2 that in the region of the bearing arrangement 38 the strut 10 is dynamically connected to the vehicle body 40 by way of a radially and rotationally stiff, axially and cardanically soft component 50.

For this purpose, the component 50 is fixed on the one hand with one end to the ball socket 48 and on the other hand, with its end region facing away from the vehicle body 40, it is securely connected to the housing 22.

The component 50 is made here as a metal bellows which completely surrounds the piston rod 16 in the region of the bearing arrangement 38.

The major advantage is that the metal bellows easily follows the cardanic motion of the strut 10 and is extremely stiff relative to torques, i.e., when the angles change, the folds of the metal bellows easily yield, and the metal bellows is soft in this direction, but when torques are applied, it is extremely stiff. When the strut 10 is deflected, no transverse forces at all form in the bearing arrangements and damper guides. Furthermore, the metal bellows prevents penetration of contaminants and dirt into the spherical bearing arrangement.

Figure 3:
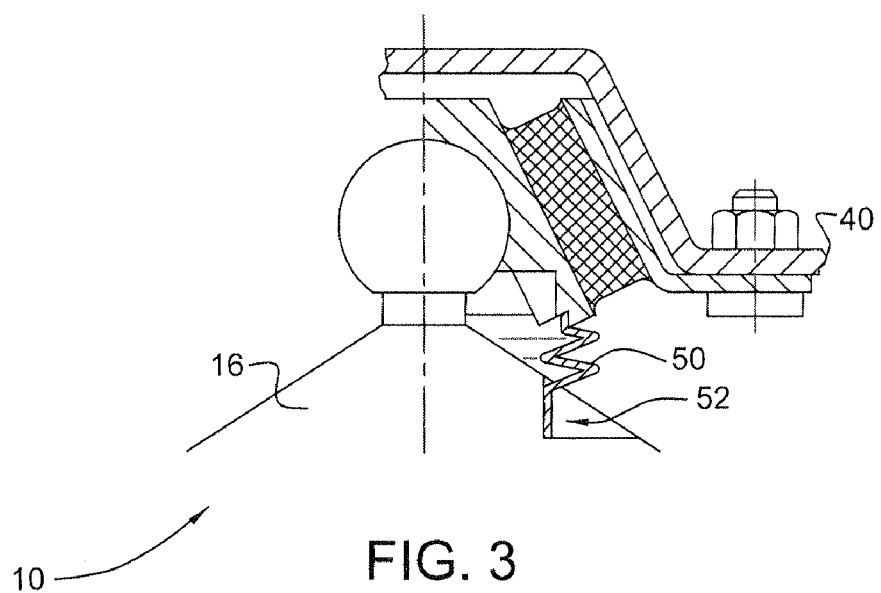

According to the embodiment shown in FIG. 3, the metal bellows 50 with its end region 52 facing away from the vehicle body 40 is fixed on the piston rod 16.

LIST OF REFERENCE NUMBERS 10 strut
12 axially adjustable spring plate
14 vibration damper
16 piston rod
18 cylinder
20 support spring
22 housing
24 stator
26 rotor
28 bearing
30 bearing
32 threaded spindle
34 threaded nut
36 radial bearing
38 bearing arrangement
40 motor vehicle body
42 spherical bearing surface
44 spherical bearing surface
46 ball pivot
48 ball socket
50 component/metal bellows
52 end region

The invention claimed is:

1. A member of an assembly of a motor vehicle, including a shock absorber including a cylinder portion operatively connected to a wheel suspension assembly of said vehicle and a piston rod portion having a ball and socket connection to a body portion of said vehicle, a threaded spindle mounted on said piston rod portion, an axially adjustable spring plate operatively connected to said threaded spindle by means of a ball and thread connection, a support spring interconnecting said spring plate and said wheel support assembly, an electric motor housing supporting a stator mounted on said piston rod portion, and a rotor of said motor rotatably mounted on said electric motor housing and rigidly connected to said threaded spindle, for preventing rotation of said motor housing relative to the axis of said piston rod portion upon energization of said motor comprising a bellows receiving a portion of said piston rod portion therethrough, having one end thereof fixedly secured to said motor housing and having the other end thereof rigidly secured to the socket of said ball and socket connection.

2. A member according to claim 1 wherein said bellows is formed of a metallic material.

* * * * *